United States Patent
Kennedy

[15] 3,704,969
[45] Dec. 5, 1972

[54] APPARATUS FOR MANUFACTURING DIAMONDS

[72] Inventor: George C. Kennedy, Los Angeles, Calif.

[73] Assignee: Teledyne, Inc., Los Angeles, Calif.

[22] Filed: Aug. 13, 1970

[21] Appl. No.: 63,356

[52] U.S. Cl. .................................................. 425/77
[51] Int. Cl. ............................................. B30b 11/32
[58] Field of Search .................... 425/77; 18/DIG. 26

[56] References Cited

UNITED STATES PATENTS

| | | | |
|---|---|---|---|
| 3,107,395 | 10/1963 | Bendy | 18/DIG. 26 |
| 3,084,388 | 4/1963 | Ballhausen | 18/DIG. 26 |
| 3,255,490 | 6/1966 | Sturm | 18/DIG. 26 |
| 3,313,871 | 4/1967 | Vogel et al. | 18/DIG. 26 |
| 3,555,597 | 1/1971 | Meadows | 18/DIG. 26 |
| 3,067,465 | 12/1962 | Giardini et al. | 18/DIG. 26 |
| 3,423,794 | 1/1969 | Wilson | 18/DIG. 26 |
| 2,941,250 | 6/1960 | Hall | 18/DIG. 26 |
| 2,992,900 | 7/1961 | Bovenboeck | 18/DIG. 26 |
| 3,082,477 | 3/1963 | Custers et al. | 18/DIG. 26 |
| 3,407,445 | 10/1968 | Strong | 18/DIG. 26 |

*Primary Examiner*—J. Howard Flint, Jr.
*Attorney*—Ronald W. Reagin, Stephen L. King and Kenneth W. Mateer

[57] ABSTRACT

A machine is disclosed for converting graphite to diamond which includes a cylindrical reaction chamber and a reaction vessel positioned in the reaction chamber for holding the charge of graphite to be converted to diamond. A piston having a fixed length and fixed diameter is positioned in the reaction chamber with its first end contacting the reaction vessel and its second end extending out of the reaction chamber. Means are provided for applying a force to the second end of the piston, thereby generating high pressure within the reaction chamber. Further means are provided for maintaining the ratio of the unsupported length to the diameter of the piston at a value less than the ratio of the fixed length to the fixed diameter of the piston.

10 Claims, 7 Drawing Figures

PATENTED DEC 5 1972 3,704,969

GEORGE C. KENNEDY
INVENTOR.

BY *Ronald W. Reagan*

ATTORNEY

GEORGE C. KENNEDY
INVENTOR.

BY
ATTORNEY

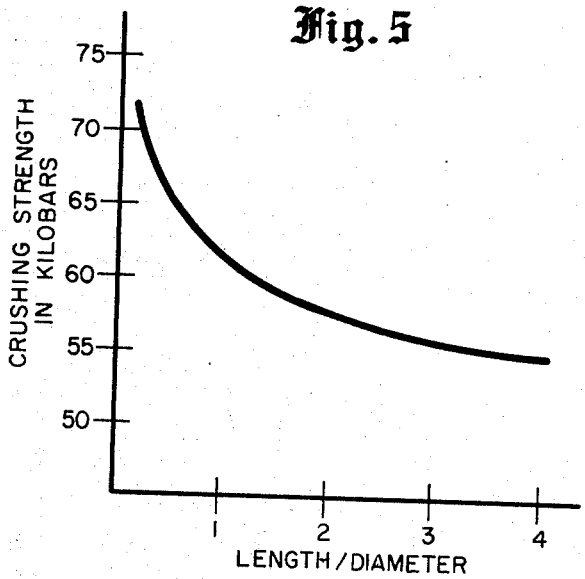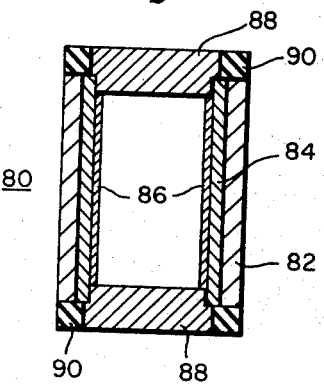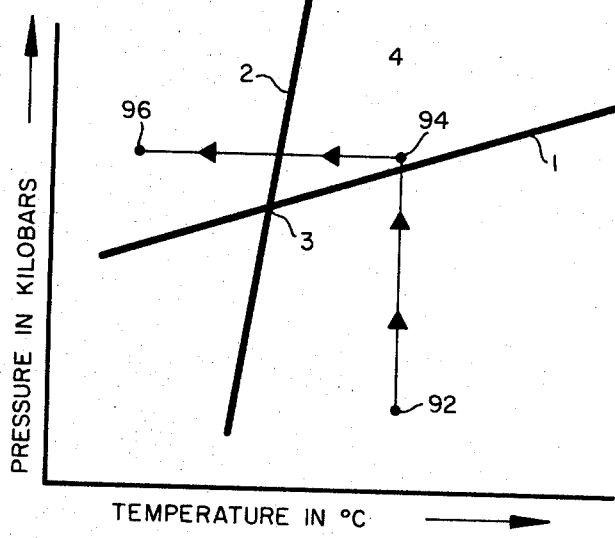

APPARATUS FOR MANUFACTURING DIAMONDS

BACKGROUND OF THE INVENTION

This invention relates to diamond making and more particularly to an improved method for converting graphite to diamond.

Diamonds are nothing but the element carbon having a particular crystal configuration. It has long been known that if other inexpensive forms of carbon, such as graphite, are subjected to sufficient temperature and pressure, it can be converted into diamond. For example, Moisson first produced very tiny diamonds in 1890. This was done by dissolving graphite in a suitable solvent at a high temperature such that the solvent was in the liquid phase and then chilling the liquid solution. The liquid solvent was converted back into the solid phase and set up extremely high internal pressures in the solvent-graphite droplet which, in combination with the high temperature at which the solvent and graphite had previously been, resulted in the graphite being converted into diamond. Of course, these methods were not susceptible to any degree of control and it was not an economic means of manufacturing diamond. This was considered to be nothing but a laboratory curiosity for many years.

In more recent years the problem of manufacturing diamonds has received a great deal of attention from investigators in the field and large sums of money have been spent by competent organizations to perfect commercially feasible apparatus and methods for manufacturing diamond. Particularly, the General Electric Company has made a major effort in this field and has achieved a fair degree of success in the diamond making field. The basic results of General Electric's efforts in this field are shown in U.S. Pat. Nos. 2,941,248 — Hall, which teaches a high temperature high pressure apparatus which is particularly designed to manufacture diamond, and 2,947,610 — Hall et al., which teaches and claims a method for making diamond. The method patent discloses that in order to manufacture diamond, the graphite must be mixed with a catalyst material selected from a group of catalysts disclosed therein. The mixture must then be subjected to a pressure of at least 75 kilobars and heated to a temperature of from 1200° to 2000° C. The high temperature high pressure apparatus patent discloses and claims a particular apparatus capable of developing the high temperatures and high pressures mentioned which General Electric felt was necessary to manufacture diamond.

In a related General Electric Patent, U.S. Pat. No. 2,947,609 — Strong, it is disclosed that diamonds can be manufactured in the Hall apparatus at pressures as low as 50 kilobars if particular metalalloys disclosed by Strong are used as catalysts.

The General Electric method and apparatus unquestionably manufactured diamond. However, the diamonds so manufactured were of quite small size, usually less than 1/100th of a carat, and the diamonds almost always contained inclusions, or small impurities within the diamonds which were bits of the catalyst metal.

There are two basic reasons why the prior art method of making diamonds has resulted in, at best, small stones of poor quality. The first of these reasons is because of a basic misunderstanding of what was occurring in the high temperature high pressure apparatus during the diamond conversion. The second reason is because of inherent limitations in the apparatus which was being used.

The prior art investigators made two fundamental mistakes in their theoretical analysis of the manufacture of diamonds. The first mistake was the error, at times quite extreme, in measuring the pressure within the high pressure apparatus. Because of the inherent nature of the apparatus, discussed in more detail below, as the applied force on the apparatus is increased, a higher and higher proportion of the force appears as load on the chamber walls of the apparatus rather than as higher pressure within the reaction chamber. A point is soon reached where practically all incremental increases in force appear as chamber wall load and none of the increase in force is reflected as increased pressure within the reaction chamber. Thus, when the investigators thought they were making diamonds at a pressure of 75 kilobars, in fact the pressure in the reaction chamber was probably closer to 52 kilobars. Since the pressures were being measured so poorly, obviously the investigators could not maintain the precise controls needed to obtain meaningful date about the nature of the reaction and to determine which precise conditions produce the best results. As a result, in order to manufacture diamond, the apparatus was operated at loads substantially higher than was really necessary, which, as is discussed in the description of the present invention below, resulted in the graphite being converted into a large number of very small diamonds and made it impossible to control the growth of a few large crystals from the same charge instead.

The second error in the theoretical analysis was in the description of the catalysts. All of the materials described as catalysts in the above mentioned Hall and Strong patents and in other General Electric patents and publications reporting their findings in this area have one factor in common. They are all good solvents of carbon when they are in their liquid phases. In fact, these catalysts are not catalysts in the reactions at all, but are merely solvents which take the graphite into solution while diamond is being precipitated from solution during the high temperature high pressure portion of the reaction. Any material in which carbon is sufficiently soluble can be used instead of the various metals or alloys disclosed in the above mentioned Hall and Strong patents. The lower temperature and pressure extremities at which graphite can be converted to diamond then becomes strictly a function of the melting point of the solvent at high pressure. There is a large body of data available as to the degree of solubility of carbon in various solvents. Indeed, the solubility of carbon in all of General Electric's catalysts was disclosed by Moisson many years ago. As was mentioned above, since again the prior art investigators did not have a good understanding of the reactions that were, in fact, occurring, they were unable to develop the precise meaningful data which might have enabled them to develop controllable methods for producing suitable diamonds having desired physical properties such as size and impurity limits.

The second reason that the prior art was unable to reproduce diamonds on a satisfactory basis lies in the inherent nature of the apparatus used. This apparatus is known to those skilled in the art as the "belt" apparatus. As is described in detail below, the apparatus simply consists of a tapered punch which fits into a correspondingly tapered die. A gasket material is placed between the punch and the die and suitable force is placed on the punch, which results in the gasket material being extruded from between the punch and the die. This has two effects, the first being to insure a good seal between the punch and the die and the second being to reduce the volume of the reaction chamber within the die and to transmit high pressures into the reaction chamber so that the graphite therein is subjected to suitable conditions to cause it to be converted to diamond. Because of the inherent nature of the tapered punch and correspondingly tapered die, the punch is capable of only a limited excursion into the die and thus the reaction chamber is inherently capable of only relatively slight changes in its volume. The difficulty with this is that diamond is substantially denser than graphite and thus when the graphite begins its conversion to diamond, there is an abrupt decrease in the volume of the charge. Since the punch cannot traverse far enough into the die, this results in an abrupt drop in pressure on the charge when the diamond conversion process actually beings. The belt apparatus is thus incapable of maintaining the necessary high pressures for more than a brief instant of time.

The above mentioned Hall patent on high temperature high pressure apparatus does disclose the use of a cylindrical punch and corresponding die but indicates that such apparatus will fracture before it will develop the necessary high pressures for diamond manufacture. The strongest materials available then and at the present time, cemented tungston carbide, rupture under pressures in the order of 47 kilobars and thus the prior art teaches that such apparatus cannot be used for the manufacture of diamonds.

OBJECTS OF THE INVENTION

It is accordingly an object of the present invention to provide an improved apparatus for converting graphite to diamond.

It is another object of the present invention to provide an improved apparatus for converting graphite to diamond in which the operating parameters can be closely controlled.

It is still another object of the present invention to provide an improved apparatus for converting graphite to diamond in which reproducible results can consistently be obtained.

It is yet another object of the present invention to provide an improved apparatus for converting graphite to diamond in which larger diamonds can be made.

It is still another object of this present invention to provide an improved apparatus for converting graphite to diamond in which the diamonds so produced are free from inclusions.

BRIEF DESCRIPTION OF THE INVENTION

Briefly stated, and in accordance with the presently preferred embodiment of the invention, a machine for converting graphite to diamond is provided which includes a cylindrical reaction chamber and a reaction vessel positioned in the chamber for holding the charge of graphite to be converted to diamond. A piston having a fixed length and fixed diameter is positioned in the reaction chamber such that its first end is in contact with the reaction vessel and its second end extends out of the reaction chamber. Means are provided for applying a force to the second end of the piston, thereby generating high-pressure within the reaction chamber, and further means are provided for maintaining the ratio of the unsupported length to the diameter of the piston at a value less than the ratio of the fixed length to the fixed diameter of the piston.

BRIEF DESCRIPTION OF THE DRAWINGS

A complete understanding of the invention, together with an appreciation of all objects and advantages thereof, may be seen by reference to the attached drawings, in which:

FIG. 5 is a graphic representation of the crushing strength of the piston of FIGS. 3 and 4 as a function of the ratio of the length of the diameter of the piston;

FIG. 6 is a cross-sectional view of the high-temperature high-pressure reaction vessel of FIGS. 3 and 4; and FIG. 7 shows another phase diagram for carbon and illustrates one method under which graphite may be converted to diamond in accordance with the present invention.

DETAILED DESCRIPTION OF THE DRAWINGS

Before considering in detail the deficiencies of the prior art and the specific manner in which the present invention overcomes these deficiencies to provide larger and higher quality man-made diamonds, it will be useful to consider in the generic sense what operations must be performed upon graphite to convert it into diamond. As is well known, both graphite and diamond are carbon, but carbon whose atoms are arranged in a different crystalline form. At atmospheric temperatures and pressures, graphite exists in its stable state and diamond exists in its metastable state. Further, at extremely high temperatures and pressures, carbon can exist in the stable state in only one or the other form, depending upon the particular temperature and pressure. Generally speaking, for a given high temperature, at high pressures diamond is the stable state of carbon and at lower pressures graphite is the stable state. Conversely, for a given high pressure, at higher temperatures graphite is the stable state of carbon and at lower temperatures, diamond is the stable state.

It is noted that when the term "graphite" is used in the specification and claims, it is not necessarily intended to be construed strictly, but is intended to mean any form of carbon other than diamond, regardless of its crystalline form.

Figure 1:
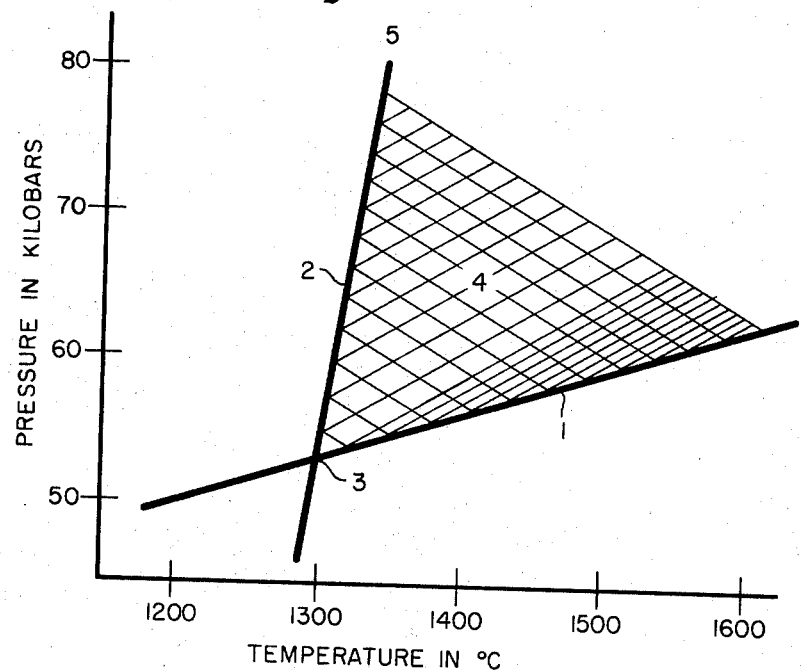
FIG. 1 shows the pressure-temperature phase diagram for carbon and illustrates the conditions under which carbon can exist in the diamond state and in the graphite state.

FIG. 1 shows graphically the pressure-temperature phase diagram of carbon, with pressure shown in kilobars and temperature in degree Centigrade. The line 1 represents the diamond-graphite equilibrium line between the diamond stable field and the graphite stable field. The diamond stable field is that portion of the plot above equilibrium line 1. The graphite stable field is the portion of the plot below equilibrium line 1. The general position of the equilibrium line 1 has been known in the prior art, with its location being both computed and also measured experimentally. For example, the location of the line is reported by R. Berman and F. Simon in Zeitschrift fur Electrochemic, 59,333 (1955). However, as was mentioned before, some of the experimental results which had been reported have erred considerably on the high-pressure side because of the reasons discussed in more detail in connection with FIG. 2 below.

In view of the known location of the equilibrium line 1, it would seem that the conversion of graphite to diamond would be a simple enough process. All that is necessary is to subject the graphite to a combination of pressure and temperature lying above the equilibrium line 1, and the conversion would be naturally effected. However, in practice obviously the conversion has not been that simple. First the pressures and temperatures shown in FIG. 1 which lie above the equilibrium line 1 are extremely high pressures and temperatures and it is difficult to design and operate suitable apparatus for containing reactions occurring at these temperatures and pressures. Next, the mere measurement of pressures and temperatures of these great magnitudes is quite difficult, as is discussed in considerably more detail in connection with FIG. 2 below, so it is difficult to know when the proper conditions for the diamond conversion are being obtained. Third, even if suitable apparatus for effecting the conversion is designed and even if the conditions are being accurately monitored so that desired pressures and temperatures can be achieved, it is not sufficient just to apply any combination of temperature and pressure lying above equilibrium line 1. In order to achieve optimum conversion of graphite into large diamond crystals free of inclusions, or small particles of foreign matter, it is necessary to subject the graphite to the the proper combination of pressure and temperature. If excess pressures and temperatures are applied, the result is the conversion of graphite to diamond, true enough, but what is obtained is hundreds of very tiny diamond crystals containing many inclusions, which is obviously not as desirable as converting the same charge of graphite into a much smaller number of much larger diamond crystals which are free of such inclusions. Fourth, experience has shown that it is not sufficient just to subject pure graphite to the necessary pressure and temperature conditions. The graphite must be mixed with a suitable substance before diamond conversion occurs, even if the proper temperature and pressure conditions are applied.

It was this fourth problem which led many of the prior art investigators astray. They assumed that since some carrier material had to be present which did not itself appear to enter into the reaction, this carrier material was a catalyst. The prior art reports many such "catalysts." For example, in U.S. Pat. No. 2,947,610 — Hall et al., it is reported that a suitable catalyst material for converting graphite to diamond can be selected from the class consisting of iron, cobalt, nickel, rhodium, ruthenium, palladium, osmium, iridium, chromium, tantalum and manganese. In U.S. Pat. No. 2,947,609 — Strong, it is reported that the catalyst can be an alloy whose components are selected from the same group of metals plus platinum.

In the investigations which led to the present invention, it was observed that all of the so-called catalysts have one physical property in common. This is that all of these materials have been known for many years to be good solvents of carbon at temperatures sufficiently high for the material to be its liquid phase. Further investigation showed that diamond conversion could be effected in any material which would dissolve carbon well when it was in its liquid phase and that conversion could not be effected in those materials which were not good solvents of carbon. From these observations it is concluded that conversion from graphite to diamond can be effected if the following conditions are met: (1) the graphite is first mixed with a suitable quantity of material which, when the material is in its liquid phase, it is a good solvent of carbon and (2) the mixture is then subjected to temperature and pressure conditions at which the material is in its liquid phase and which lies above the equilibrium line of FIG. 1. When these conditions are considered, it is seen that the so-called catalysts reported in the prior art have no catalytic effect whatsoever on the conversion of graphite into diamond, but are instead merely suitable solvents which take graphite into solution and which precipitate diamond out of solution so that the conversion can be effected.

Now referring still to FIG. 1, the line 2 represents the plot of the melting point of a material as a function of pressure and temperature. Line 2 can be termed the solid-liquid phase boundary line. In this particular case, the phase boundary line 2 represents the boundary between the liquid and solid phase of a nickel-iron alloy having 50 percent nickel and 50 percent iron. On the left-hand side of phase boundary line 2, the alloy is in its solid phase and on the right-hand side of phase boundary line 2, the alloy is in its liquid phase. This particular alloy is known to be a good solvent of carbon when it is in its liquid phase, and thus this alloy is, under the conditions described above, a good solvent for use in a graphite to diamond conversion. The point 3, which is the intersection of equilibrium line 1 and phase boundary line 2, represents the lowest temperature and pressure at which graphite can be converted into diamond when mixed with this particular solvent. The shaded region 4 bounded by the section 5–3 of phase boundary line 2 and section 3–6 of equilibrium line 1, which may be termed the diamond growing region of the plot, represents that portion of the diamond stable field in which graphite can be converted into diamond using this particular alloy as a solvent. It is noted that for this particular solvent, the curve 5–3–6 corresponds exactly to the "catalyst curves" which define the diamond growing regions which are shown in FIG. 1 of U.S. Pat. No. 2,947,609 — Strong and in FIG. 3 of U.S. Pat. No. 3,031,269 — Bovenkerk, both assigned to the General Electric Company.

Figure 2:
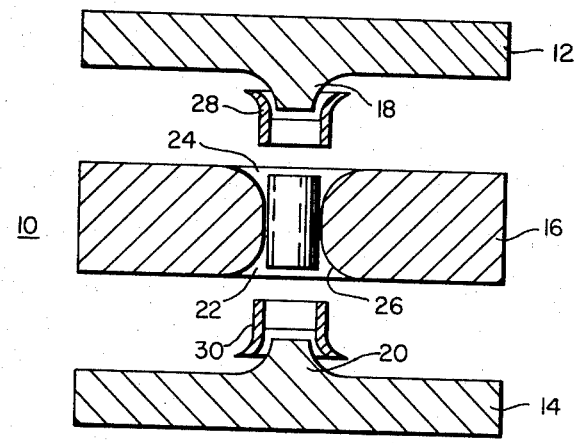
FIG. 2 shows a schematic representation of the prior art apparatus for converting graphite to diamond, and illustrates the disadvantages associated therewith.

FIG. 2 shows a schematic representation of the type of prior art high pressure high temperature apparatus known as the belt apparatus, such as is disclosed in the above mentioned U.S. Pat. No. 2,947,610 — Hall et al. and U.S. Pat. No. 2,941,248 — Hall. As shown therein, the apparatus 10 includes two punches 12 and 14, each positioned on opposite sides of an opening in an annular die 16. Each of the punches 12 and 14 includes a respective tapered portion 18 and 20 which tapered portions enter the reaction chamber 22 of die 16 when punches 12 and 14 are moved towards die 16. Reaction chamber 22 is bounded by tapered surfaces 24 and 26 which are complimentary to the surfaces of the tapered portions 18 and 20 of punches 12 and 14, respectively. Two gaskets 28 and 30 are provided which fit between the tapered punch portions 18 and 20 and their respective tapered surfaces 24 and 26 in die 16. The gaskets 28 and 30 are usually constructed from a suitable ceramic material such as pyrophyllite.

In operation, the graphite to be converted to diamond is placed in a reaction vessel 32, shown schematically, which is in turn placed in reaction chamber 22 of die 16. The gaskets 28 and 30 are placed around reaction vessel 32 and the dies 12 and 14 are brought into contact with the gaskets 28 and 30. Reaction vessel is then heated electrically to a suitable temperature and suitable forces are applied to punches 12 and 14 to raise the pressure on reaction vessel 32 to the proper conditions at which diamond conversion occurs.

The forces applied on punches 12 and 14 are applied directly onto the ends of reaction vessel 32 and onto the inner surfaces of gaskets 28 and 30. As these forces are increased, the tapered portions 18 and 20 of punches 12 and 14 make limited excursions in reaction chamber 22. As this occurs, the thickness of gaskets 28 and 30 becomes thinner and thinner, with the gasket material being extruded out of reaction chamber 22. The gaskets 28 and 30 thus provide the dual function of maintaining a suitable pressure seal within the reaction chamber 22 while at the same time allowing the tapered portions 18 and 20 of punches 12 and 14 to make this limited excursion into reaction chamber 22. However, the amount of this excursion is obviously limited to an amount at which the thickness of the gaskets 28 and 30 approaches zero. In practice, it has been found that the minimum thickness to which the gaskets 28 and 30 can be extruded is about 0.05 inches.

There are two severe drawbacks to the belt apparatus just described. Both of these drawbacks are inherent in the tapered shape of the punch and the die. The first problem lies in accurately determining what is the actual pressure appearing in reaction chamber 22. It is readily appreciated that part of the forces applied through punches 12 and 14 appears on the tapered inner surface of gaskets 28 and 30 and that only a portion of the applied force appears as pressure in reaction chamber 22. As the forces are increased and the gaskets 28 and 30 are extruded thinner and thinner, a point is soon reached where practically all incremental forces applied through punches 12 and 14 appear on the tapered inner surfaces 24 and 26 rather than as increases in the pressure in reaction chamber 22. Thus, it is very difficult, if not impossible, to accurately measure the pressures appearing in reaction chamber 22. In practice, when the prior art investigators had applied sufficient forces to dies 12 and 14 to create what they thought was a pressure of perhaps 75 kilobars within the reaction chamber 22, the actual pressure was probably more in the order of 52 kilobars.

The second inherent problem with the belt apparatus of FIG. 2 lies in the inherent limited excursion of punches 12 and 14 into die 16. As was discussed above, and as is readily obvious from examination of FIG. 2, the length of excursion of punches 12 and 14 into die 16 is limited to being a fraction of the thickness of gaskets 28 and 30. Since the volume of reaction chamber 22 is very nearly a linear function of the position of the end of the punches, reaction chamber 22 can undergo only a limited incremental change in volume. This might not appear to be too significant a problem, until one considers that there is a significant difference in the density of diamond and the density of graphite. The density of diamond is about 3.4 while the density of graphite is only 2.23. Thus, when the proper temperature and pressure conditions are present and the graphite begins converting into diamond, there is an abrupt decrease in the volume of the material in reaction chamber 22. In order to maintain the necessary high pressure for any period of time, the punches 12 and 14 must be able to traverse further into reaction chamber 22 to compensate for this drop in volume or else the drop in volume will be immediately reflected as an abrupt drop in pressure in reaction chamber 22. As is seen, the volume of reaction chamber 22 in the belt apparatus is inherently incapable of any significant change in volume, and thus the apparatus can maintain the necessary high pressure on a reaction vessel 32 loaded with graphite only until a sufficient quantity of the graphite has been converted into diamond to cause the volume to decrease to a point at which the punches 12 and 14 can traverse no further into reaction chamber 22. In practice, it has been observed that once conversion begins, the pressure can be maintained in the diamond stable field only for a few seconds.

What would frequently occur when belt apparatus of the type shown in FIG. 2 was used was that the operators would apply too much force to the punches, since they did not know with any degree of accuracy at all what resultant pressures appeared in the reaction chamber, and this would result in the graphite charge in the reaction vessel being subjected to temperatures and pressures far above the equilibrium line 1 of FIG. 1 to a point well into the diamond growing region 4 of FIG. 1. This sudden plunge into the diamond growing region would cause many small diamond particles to be formed, instead of only a few larger diamond particles. Also, because of the above mentioned change in density, the pressure in the apparatus would quickly drop back to a point below equilibrium line 1 and none of the small diamond particles formed could be subjected to the necessary growth conditions for a sufficient period of time to grow into sizable crystals themselves.

Figure 3:
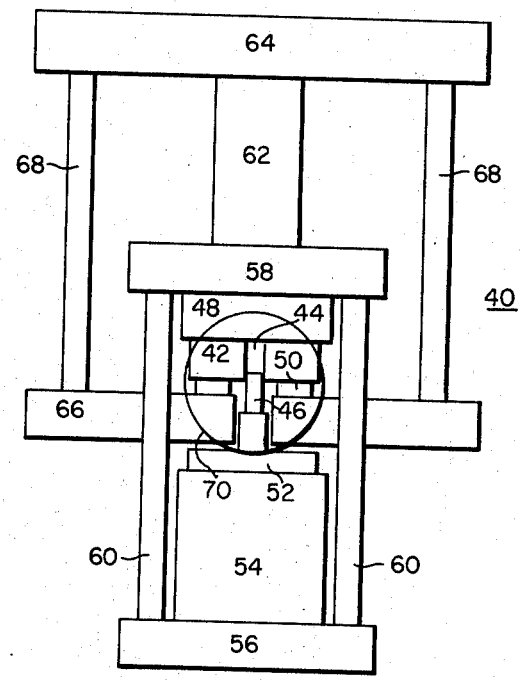
FIG. 3 is a schematic representation of high-temperature high-pressure apparatus for making diamonds in accordance with the present invention.

FIG. 3 shows a schematic representation of high pressure apparatus 40 which may be used in accordance with the present invention to convert graphite to diamond. The apparatus 40 includes a high pressure plate 42 which includes a cylindrical central cavity 44 which forms the reaction chamber in which the diamond conversion occurs. This reaction chamber 44 corresponds to the reaction chamber 22 of the belt apparatus of FIG. 2. A cylindrical shaped piston 46 fits into reaction chamber 44. As is described in more detail below, the necessary high pressure is generated in reaction chamber 44 by advancing piston 46 into reaction chamber 44.

High pressure plate 42 is bounded on its upper and lower ends by upper end load plate 48 and lower end load plate 50 respectively. These end load plates support the ends of high pressure plate 42 to prevent it from rupturing when it is under extreme pressure within reaction chamber 44. In addition, upper end load plate 48 serves to seal the top end of reaction chamber 44. Lower end load plate 50 includes a central opening through which piston 46 projects into reaction chamber 44.

The necessary forces to move piston 46 into reaction chamber 44, thereby generating the high pressure within reaction chamber 44, are applied to piston 46 through piston pusher 52. The forces are generated in a hydraulic ram 54, shown schematically. The force cycle is closed by positioning member 56 below hydraulic ram 54 and member 58 above upper end load plate 48 and tying members 56 and 58 together with tie rods 60. Thus when hydraulic ram 54 is actuated, piston 46 advances into into reaction chamber 44 and upper end load plate 48 is held tightly over the end of reaction chamber 44, thereby generating high pressures therein.

When extremely high pressures are generated in reaction chamber 44, forces are created in high pressure plate 42 which might cause it to rupture out its ends. To prevent this, a second hydraulic ram 62 is provided having one end positioned above member 58. Another member 64 is provided above the other end of hydraulic ram 62. Yet another member 66 is provided beneath lower end load plate 50 and members 64 and 66 are tied together through tie rod 68. It is noted that member 66 includes a central opening through which piston pusher 52 contacts piston 46 and additional openings through which tie rods 60 interconnect members 56 and 58. When hydraulic ram 62 is actuated, high pressures are thus placed on the ends of high pressure plate 42 through end load plates 48 and 50 to counteract the stresses generated internally in high pressure plate 42 when high pressures are generated in reaction chamber 44.

Figure 4:
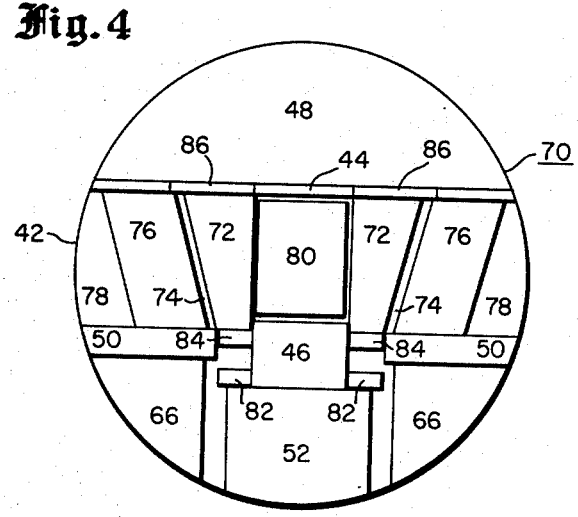
FIG. 4 is a cross-sectional view of a high-pressure high-temperature reaction chamber of the apparatus of FIG. 3 and particularly illustrates many of the features of the present invention.

It is noted that high pressure apparatus of the general type shown in FIG. 3 is discussed by Kennedy and LaMori in an article entitled "Some Fixed points on the High Pressure Scale" appearing in Progress in Very High Pressure Research, Bundy, Hibbard & Strong, Ed., J. Wiley & Sons, 1961, and in an article by Kennedy, Haygarth and Getting entitled "Determination of the Pressure of Barium I–II Transition with Single Stage Piston — Cylinder Apparatus" appearing in The Journal of Applied Physics, Volume 38, No. 12, 4557–4564, Nov. 1967, FIG. 4 shows a cross sectional view of an enlargement of the detail 70 of FIG. 3 and illustrates certain features of the present invention which, for clarity, are not shown in FIG. 3. As shown therein, high pressure plate 42 comprises an inner pressure vessel 72 surrounded by a plurality of concentric support rings 74, 76 and 78. Pressure vessel 72 is constructed from a material capable of withstanding the highest possible pressures. Of the presently known materials, cemented tungsten carbide is preferred because of its outstanding ability to withstand compressive forces. However, tungsten carbide is quite brittle and so it is necessary to surround it with the support rings 74, 76 and 78, which may be made of high-grade steel. Support rings 74, 76 and 78 are shrunk onto pressure vessel 72 and to each other to provide the tightest interference fit. Also, it has been found desirable to provide a slight angular taper between the various members, as shown in FIG. 4.

Piston 46 fits into the lower end of reaction chamber 44 in high pressure plate 42. Again, it is desirable to construct piston 46 from the material capable of withstanding the highest compressive forces, such as tungsten carbide. In operation, piston 46 is advanced into reaction chamber 44 by piston pusher 52, as was described in detail in FIG. 3 above, until one end of piston 46 contacts the end of a reaction vessel 80, to provide high pressures on reaction vessel 80, shown schematically in FIG. 4 and described in more detail in FIG. 6 below, to effect the conversion of graphite to diamond in reaction vessel 80. The second end of piston 46 projects out of reaction chamber 44 and is contacted by piston pusher 52, as described above.

Binding rings 82 and 84 are provided around piston 46. Binding ring 82 always stays around the second end of piston 46 and binding ring 84 is friction fitted around the body of piston 46 and slides along piston 46 as the piston 46 traverses into reaction chamber 44. The function of binding rings 82 and 84 is described in detail in connection with the description of FIG. 5 below.

FIG. 4 also shows electrical insulating member 86 positioned between upper end load plate 48 and high pressure plate 42. Insulating member 86 is provided so that reaction vessel 80 may be electrically heated by applying a suitable potential between upper end load plate 48 and piston pusher 52. More details of the electrical heating manner are shown in connection with FIG. 6 below.

As was mentioned above, both cylinder 46 and pressure vessel 72 are preferably made from cemented tungsten carbide, which is one of the hardest materials presently known. However, even tungsten carbide has difficulty withstanding the pressures of the magnitude shown in the phase diagram of FIG. 1. Pressure vessel 72 can be reinforced with interference fitting steel rings, as is shown in FIG. 4, but obviously this approach cannot be taken with piston 46, since it must be free to move into reaction chamber 44. Thus, piston 46 itself must withstand pressures in the magnitude of 50 to 70 kilobars, or some means must be employed to enable it to do so. The best available tungsten carbide pistons are claimed by their manufacturer to be able to withstand a pressure of only about 47 kilobars, and the pistons so obtainable usually do rupture when subjected to pressures of this order. Thus, it is seen that some means must be employed to strengthen the pistons to withstand substantially higher pressures while still allowing them to traverse further into reaction chamber 44 when the graphite to diamond conversion occurs to compensate for the resultant decrease in volume.

One approach which has proven to be satisfactory is to provide binding rings 82 and 84 on piston 46. As is shown in FIG. 4, binding ring 82 is positioned with an interference fit around the second end of piston 46 adjacent to piston pusher 52. Binding ring 84 is positioned with a friction fit around the body of piston 46 and is initially placed near the top of piston 46. As piston 46 enters reaction chamber 44, binding ring 84 is restrained by the bottom of high pressure plate 42 and slides along the side walls of piston 46 as it enters reaction chamber 44.

FIG. 5 shows graphically the effect of binding rings 82 and 84 on the crushing strength of a cemented tungsten carbide piston 46. The curve therein plots the crushing strength in kilobars as a function of the ratio of the unsupported length to the diameter of the piston. "Unsupported length" means the length between binding rings 82 and 84. It is seen that the use of the binding rings dramatically increases the crushing strength of the piston and if binding rings are employed to provide an effective length to diameter ratio of the unsupported piston of one or less, a crushing strength in excess of 60 kilobars can easily be obtained. This enables such apparatus to be used in diamond conversion to overcome the defects of the belt apparatus of FIG. 2.

Prior reports on the crushing strength of cemented tungsten carbide pistons can be found in an article by Kennedy and Haygarth entitled "Crushing Strength of Cemented Tungsten Carbide Pistons" appearing in The Review of Scientific Instruments, Volume 38, No. 11, 1590–1592, Nov. 1967.

FIG. 6 shows a cross sectional view of a reaction vessel 80 which may conveniently be used with the high-pressure apparatus of FIGS. 3 and 4 to hold the graphite charge which is to be converted into diamond. As shown therein, reaction vessel 80 includes an outer cylinder 82, which is preferably made from a hydrogen-free material such as sodium chloride, and an inner cylinder 84 which is made from Pyrex glass. An inner graphite sleeve 86 is provided which is the electrical heater element for heating the charge to the desired high temperature. Each end of reaction vessel 80 is closed by an end plug 88, which is electrically conductive and which serves as an electrical lead to graphite heater 86. Insulator rings 90 are provided to prevent end plugs 88 from shorting out against the side walls of reaction chamber 44.

During the experiments which led to the present invention, it was observed that, for reasons not yet understood, the presence of hydrogen in reaction chamber 44 is very detrimental to the conversion of graphite into diamond. For this reason, the outer cylinder 82 of reaction vessel 80 is constructed from sodium chloride, or pressed salt, or any other suitable anhydrous material, even though this material is harder to handle than a material such as talc. The problem with talc is that it is $MgO.SiO_2.H_2O$. When the talc is subjected to the high temperatures and pressures within reaction chamber 44, the water of crystallization is broken apart and the water is broken down into its hydrogen and oxygen components, thus liberating hydrogen into the reaction chamber. For unknown reasons, this hydrogen so liberated greatly impedes the formation of diamonds.

The term "anhydrogenous" may be used to describe a material which contains no hydrogen in its composition, either as free hydrogen or as an element in a hydrogen-containing compound. Using the term so defined, it has been found that reaction vessel 80 should be formed entirely from anhydrogenous material.

Also, in order to maintain a hydrogen free reaction chamber, it was discovered that hydrogen-containing lubricants should not be used in the reaction chamber area. In the piston-cylinder apparatus of FIGS. 3 and 4 it is necessary to provide as close a tolerance as possible between the outer diameter of piston 46 and the inner diameter of reaction chamber 44. In this general type of cylinder-piston high pressure apparatus, in order to reduce the friction between the piston and the cylinder, it is customary to lubricate it with a lubricant such as molybdenum disulfide. This lubricant itself does not contain hydrogen, but it is usually dissolved in a hydrocarbon grease to be coated on the walls. It has been found that greatly improved results are obtained if the molybdenum disulfide is instead dissolved in a fluorocarbon base such as perflourated kerosine before being coated on the walls of the piston and cylinder. Thus, all materials present in the reaction chamber are selected to be anhydrogenous.

The apparatus used in accordance with the present invention to convert graphite to diamond has thus been described in detail. Consider now the manner in which this apparatus is operated to effect the conversion. A mixture of graphite and of the material to be used as a solvent is placed in reaction vessel 80 of FIG. 6. For example, the solvent may be any carbon solvent listed in Hansen, Constitution of Binary Alloys, McGraw-Hill Book Co. (1958), such as the iron-nickel alloy discussed above, and the proportions of the solvent to graphite may be 20 to 80 percent. This mixture, termed the charge, is placed inside reaction vessel 80 and the end plugs 88 are placed upon it. Reaction vessel 80 is then placed in reaction chamber 44 of the apparatus 40 of FIGS. 3 and 4 and piston 46 is inserted into reaction chamber 44 until reaction vessel 80 is tightly confined between upper end load plate 48 and one end of piston 46. The charge is then heated by applying an electrical potential between upper end load plate 48 and piston pusher 52, thus supplying electrical current to graphite heater 86 through end plugs 88 of reaction vessel 80. The hydraulic rams 54 and 62 are then actuated. The charge within reaction vessel 80 is thus heated and subjected to high pressures.

Continuing the description of the operation of the apparatus in accordance with the invention, reference is now made to FIG. 7, which is a pressure-temperature phase diagram of carbon similar to that shown in FIG. 1. Shown therein is the equilibrium line 1 and the phase boundary line 2, as was described in detail in connection with the description of FIG. 1 above. Again, the curve 5–3–6 defines the diamond growing region 4.

Pressure and temperature are applied to the charge in the reaction vessel 80 in the manner described above until a point 92 is reached which lies to the right of phase boundary line 2 but beneath equilibrium line 1. At this point the solvent is in its liquid phase and the graphite is dissolved in the solvent. However, since point 92 lies below equilibrium line 1, the carbon remains in the graphite state. Pressure is now increased by further actuating hydraulic ram 54 until the point 94 is reached just above equilibrium line 1 in diamond growing region 4. At this point, the conditions are appropriate for converting graphite into diamond and such a conversion occurs.

It has been found that by placing point 94 just above equilibrium line 1, only a few relatively large diamonds will be formed from the charge rather than a large number of relatively small diamonds. Dramatically improved results are obtained if the pressure at point 94 is limited to no more than 0.1 kilobar above equilibrium line 1. It is believed that the reason for this is that at a point quite near or practically on equilibrium line 1, initial growth begins quite slowly and a small number of diamonds begin crystallizing. As these conditions are maintained for a period of time, additional graphite is converted to diamond, and this additional conversion occurs around the initially formed diamonds, which may be thought of as seeds. If these conditions are maintained for a long enough period of time, practically all of the graphite will be converted to diamond and a small number of seeds will grow into relatively large diamonds. In practice, diamonds of over one carat have been made in this manner.

In contrast to this, if the pressure is increased to a point far into the diamond growing region 4, many small diamonds are formed because the conditions are so far into the diamond growing region that diamond conversion occurs simultaneously all through the charge, rather than in only a few locations at first, and thus the seed effect described above does not occur.

Continuing now the description of the operation of the present invention, as diamond conversion occurs at point 94, the volume of the charge decreases abruptly, because of the above mentioned increase in density of the carbon as conversion occurs. To compensate for this, piston 46 is advanced further into reaction chamber 44 to reduce its volume while maintaining the same pressure. It is primarily this feature and the ability to effect this result that provides the great advances of this invention over the prior art.

After the charge has been maintained at the point 94 for a sufficient period of time, typically about 30 minutes for a charge of about 10 grams, the temperature is then reduced by reducing the current through the electrical heater while maintaining the pressure at substantially the same level until the point 96 is reached which is to the left of phase boundary line 2. This sequence is followed in order that the diamonds are not reconverted back to graphite. After the point 96 is reached the temperature and pressure may be reduced to room temperature and pressure and the now diamond bearing charge withdrawn from the reaction vessel.

The following are the details of specific runs in which graphite was successfully converted to diamond in the manner described above. It is noted that each of the following examples indicates the percentage of the charge of graphite which was converted to diamond. In each instance, the diamond so converted was not separated from the solvent metal or from the unconverted graphite which might have remained in the charge. Instead, the percentage of diamond conversion was calculated by measuring the reduction in the volume of the charge, taking into account the higher density of diamond described above.

EXAMPLE 1

A charge comprising 2.1 grams of graphite and 2.4 grams of a solvent which was an alloy containing 60 percent iron and 40 percent nickel was placed in the reaction vessel. The reaction vessel was placed in the reaction chamber, in which the pressure was increased to 54 kilobars and the temperature increased to 1400° C. These conditions were maintained for 55 minutes, during which time period the piston was continuously advanced into the reaction chamber while maintaining the pressure of 54 kilobars to compensate for the volume reduction described above. At the end of this time period, temperature and pressure conditions were returned to normal, in the manner described above. 80 percent of the graphite was converted to diamond.

EXAMPLE 2

A charge comprising 2.1 grams of graphite and 2.4 grams of a solvent which was an alloy containing 60 percent iron and 40 percent nickel was placed in the reaction vessel. The reaction vessel was placed in the reaction chamber, in which the pressure was increased to 62 kilobars and the temperature increased to 1460° C. These conditions were maintained for 22 minutes, during which time period the piston was continuously advanced into the reaction chamber while maintaining the pressure of 62 kilobars, to compensate for the volume reduction described above. At the end of this time period, temperature and pressure conditions were returned to normal in the manner described above. 50 percent of the graphite was converted to diamond.

EXAMPLE 3

A charge comprising 2.1 grams of graphite and 2.4 grams of a solvent which was an alloy containing 60 percent iron and 40 percent nickel was placed in the reaction vessel. The reaction vessel was placed in the reaction chamber, in which the pressure was increased to 58 kilobars and the temperature increased to 1400° C. These conditions were maintained for 12 minutes, during which time period, the piston was continuously advanced into the reaction chamber while maintaining the pressure of 58 kilobars to compensate for the volume reduction described above. At the end of this time period, temperature and pressure conditions were returned to normal, in the manner described above. 55 percent of the graphite was converted to diamond.

EXAMPLE 4

A charge comprising 2.1 grams of graphite and 2.4 grams of a solvent which was an alloy containing 60 percent iron and 40 percent nickel was placed in the reaction vessel. The reaction vessel was placed in the reaction chamber, in which the pressure was increased to 56 kilobars and the temperature increased to 1460° C. These conditions were maintained for 40 minutes, during which time period, the piston was continuously advanced into the reaction chamber while maintaining the pressure of 56 kilobars to compensate for the volume reduction described above. At the end of this time period, temperature and pressure conditions were returned to normal, in the manner described above. 45 percent of the graphite was converted to diamond.

EXAMPLE 5

A charge comprising 2.1 grams of graphite and 2.4 grams of a solvent which was an alloy containing 60 percent iron and 40 percent nickel was placed in the reaction vessel. The reaction vessel was placed in the reaction chamber, in which the pressure was increased to 54 kilobars and the temperature increased to 1350° C. These conditions were maintained for 11 minutes, during which time period, the piston was continuously advanced into the reaction chamber while maintaining the pressure of 54 kilobars to compensate for the volume reduction described above. At the end of this time period, temperature and pressure conditions were returned to normal, in the manner described above. 60 percent of the graphite was converted to diamond.

EXAMPLE 6

A charge comprising 1.45 grams of graphite and 1.45 grams of a solvent which was an alloy containing 78 percent nickel, 15 percent chromium and 7 percent iron was placed in the reaction vessel. The reaction vessel was placed in the reaction chamber, in which the pressure was increased to 64 kilobars and the temperature increased to 1350° C. These conditions were maintained for 10 minutes, during which time period, the piston was continuously advanced into the reaction chamber while maintaining the pressure of 64 kilobars to compensate for the volume reduction described above. At the end of this time period, temperature and pressure conditions were returned to normal, in the manner described above. 30 percent of the graphite was converted to diamond.

EXAMPLE 7

A charge comprising 1.45 grams of graphite and 1.45 grams of a solvent which was an alloy containing 78 percent nickel, 15 percent chromium and 7 percent iron, was placed on the reaction vessel. The reaction vessel was placed in the reaction chamber, in which the pressure was increased to 57 kilobars and the temperature increased to 1250° C. These conditions were maintained 18 minutes, during which time period, the piston was continuously advanced into the reaction chamber while maintaining the pressure of 57 kilobars to compensate for the volume reduction described above. At the end of this time period, temperature and pressure conditions were returned to normal, in the manner described above. 40 percent of the graphite was converted to diamond.

EXAMPLE 8

A charge comprising 1.45 grams of graphite and 1.45 grams of a solvent which was an alloy containing 78 percent nickel, 15 percent chromium and 7 percent iron, was placed in the reaction vessel. The reaction vessel was placed in the reaction chamber, in which the pressure was increased to 60 kilobars and the temperature increased to 1300° C. These conditions were maintained for 7 minutes, during which time period, the piston was continuously advanced into the reaction chamber while maintaining the pressure of 60 kilobars to compensate for the volume reduction described above. At the end of this time period temperature and pressure were returned to normal, in the manner described above. 10 percent of the graphite was converted to diamond.

EXAMPLE 9

A charge comprising 2.1 grams of graphite and 2.4 grams of a solvent which was an alloy containing 60 percent iron and 40 percent nickel, was placed in the reaction vessel. The reaction vessel was placed in the reaction chamber in which the pressure was increased to 56 kilobars and the temperature increased to 1340° C. These conditions were maintained for 90 minutes, during which time period, the piston was continuously advanced into the reaction chamber while maintaining the pressure of 56 kilobars to compensate for the volume reduction described above. At the end of this time period, temperature and pressure conditions were returned to normal, in the manner described above. 95 percent of the graphite was converted to diamond.

While the invention is thus disclosed and the preferred embodiment described in detail, it is not intended that the invention be limited to this shown embodiment. Instead, many modifications will occur to those skilled in the art which lie within the spirit and scope of the invention. Accordingly, it is intended that the invention be limited only by the appended claims.

What is claimed is:

1. A machine for converting graphite to diamond, comprising in combination:
    a body formed from high pressure resistant material having a cylindrical cavity therein which forms a cylindrical reaction chamber having a predetermined diameter,
    a cylindrical reaction vessel positioned in said chamber for holding a charge of graphite to be converted to diamond, said reaction vessel having an outside diameter such that it has a snug sliding fit with said reaction chamber,
    a piston having a cross-section substantially corresponding to the cross-section of said cylindrical reaction chamber and having a fixed length and fixed constant diameter positioned in said reaction chamber, the fixed diameter of said piston being substantially equal to the outside diameter of said reaction vessel for a distance along said piston sufficient to allow said piston to advance further into said reaction chamber to maintain constant pressure on said reaction vessel during the time that said graphite is being converted to diamond, said piston being positioned so that its first end can exert force against said reaction vessel and its second end extends out of said reaction chamber,
    means for applying a force to said second end of said piston, thereby generating high pressure within said reaction chamber, and
    means for maintaining the ratio of the unsupported length to the diameter of said piston at a value less than the ratio of the fixed length to the fixed diameter of said piston.

2. The combination of claim 1 in which said means for maintaining the ratio of the unsupported length to the diameter of said piston at a value less than the ratio of the fixed length to the fixed diameter of said piston comprises a first binding ring positioned around said second end of said piston and a second binding ring positioned around the body of said piston.

3. The combination of claim 2 in which said second binding ring is positioned around the body of said piston with a sliding friction fit so that said second binding ring slides along the body of said piston as said piston traverses further into said reaction chamber.

4. The combination of claim 1 in which the ratio of the unsupported length to the diameter of said piston is maintained at a value of less than one.

5. The combination of claim 1 in which said reaction vessel comprises a cylinder having an outer diameter substantially equal to the inner diameter of said reaction chamber and having a length shorter than the length of said reaction chamber, an electrically conductive sleeve positioned concentrically within said cylinder and first and second electrically conductive end caps closing the ends of said cylinder and making electrical contact with said sleeve.

6. The combination of claim 5 in which said cylinder is formed from an anhydrogenous material and said sleeve is formed from graphite.

7. The combination of claim 6 which further includes means for heating said reaction vessel, comprising means for applying an electrical potential between said first and second end caps.

8. The combination of claim 7 in which said means for maintaining the ratio of the unsupported length to the diameter of said piston at a value less than the ratio of the fixed length to the fixed diameter of said piston comprises a first binding ring positioned around said second end of said piston and a second binding ring positioned around the body of said piston.

9. The combination of claim 8 in which said second binding ring is positioned around the body of said piston with a sliding friction fit so that said second binding ring slides along the body of said piston as said piston traverses further into said reaction chamber.

10. The combination of claim 9 in which the ratio of the unsupported length to the diameter of said piston is maintained at a value of less than one.

* * * * *